3,414,598
METHOD OF PREPARING ZINC CARBOXYLATE COORDINATED COMPLEXES OF AROMATIC ZINC DITHIOPHOSPHATES
Edwin M. Nygaard, Woodbury, N.J., assignor to Mobil Oil Corporation, a corporation of New York
No Drawing. Filed Aug. 24, 1964, Ser. No. 391,762
12 Claims. (Cl. 260—429.9)

ABSTRACT OF THE DISCLOSURE

Zinc carboxylate-coordinated zinc dithiophosphate aromatic salts are prepared by the method of reacting an aromatic dithiophosphoric acid with from 10% to 60% molar excess of zinc oxide and either a carboxylic acid or a zinc carboxylate containing from 1 to 20 atoms, in the presence of water and a solvent.

---

This invention relates to a method for preparing lubricating oil additives. More particularly, it relates to an improved method for preparing zinc carboxylate-coordinated zinc dithiophosphate salts.

Although zinc salts or dithiophosphoric acid, also known as zinc phosphorodithioates, are used as antioxidants and corrosion inhibitors in lubricating oils, they cannot be used in engines having silver surfaces. The zinc salts instead of inhibiting corrosion, as they are specifically intended to do, actually attack exposed silver parts of the engine. In the method described in U.S. Patent No. 3,102,096, the corrosive nature of the zinc salts toward silver is overcome by the use of novel zinc carboxylate coordinated complexes of zinc dithiophosphates. Although the exact structure of the coordinated complexes is not exactly known, the complexes possess the same corrosion-inhibiting characteristics of the uncomplexed salts, and yet they may be safely used in engines having silver-surfaced parts.

The preparation of these complexed salts as described and carried out in the aforementioned patent involves the formation of the zinc dithiophosphate. An aliphatic alcohol or an aromatic alcohol, such as a phenol, is reacted with phosphorus pentasulfide. This reaction takes place either in the presence of zinc oxide to form the zinc salt in one step, or alone to form the dithiophosphoric acid first and then, by reaction of the acid with zinc oxide, to form the zinc salt. The zinc salt is converted to the coordinated complex salt by reaction with a zinc carboxylate.

The major drawback with this procedure is that in the case of diaryl dithiophosphates it is necessary to use 120% excess of zinc oxide over the stoichiometric requirement to prevent hyrdolytic breakdown of the dithiophosphoric acid. The diaryl and the dialkylaryl compounds appear to be especially susceptible to water. While the cost of such a large amount of zinc oxide is a considerable disadvantage, of even greater concern is the delay in filtering out such a large quantity of unreacted material from the desired product. Since very little solids form as by-products in this reaction sequence, the filtration step is required mainly to remove the additional zinc oxide. Furthermore, zinc oxide forms a rather thick, heavy cake during filtration thereby impeding the refining stage of the desired product even longer. On a commercial scale, the cost of production of the complex salt, in view of purchasing large amounts of zinc oxide and filter-aids and of extensive filtration operations, would be excessive.

The major object of this invention, therefore, is to provide a method of producing zinc carboxylate-coordinated zinc diaryl dithiophosphate salts using less amounts of zinc oxide than heretofore.

The aforementioned and other objects I achieve by reacting diaryl dithiophosphoric acid with a zinc compound, preferably zinc oxide, in the presence of a zinc carboxylate, wherein the available zinc oxide is in excess of 10% to 60% over the stoichiometric requirement, to yield a zinc carboxylate-zinc dithiophosphate complex salt. Preferably the excess of zinc oxide is in the range of 15% to 30% above the minimum requirement.

While it has hitherto been the practice to prepare a zinc dithiophohphate salt and then react it with the zinc carboxylate, the method of this invention is to prepare a reaction mixture containing all of the reactants required to produce the complex salt. Surprisingly, I have discovered that by using the method herein disclosed, considerably less zinc oxide is required and the total reaction and purification time is shortened. I also find that by following the conditions of my method, very little hydrolysis occurs; the yields range from about 90% to over 98%.

Broadly, the method of this invention involves the addition of zinc oxide, preferably in the form of a water slurry, to the reaction vessel. Into this slurry is introduced the zinc carboxylate, and thereafter the dithiophosphoric acid is added. The addition of the dithiophosphoric acid is preferably performed gradually, over an extended period of time. Alternatively, the zinc oxide slurry and the zinc carboxylate may be added together to the dithiophosphoric acid. In either case, reaction between the zinc oxide and the dithiophosphoric acid should commence with the carboxylate coordinating salt present.

My preferred method is to form the zinc carboxylate in situ. Instead of employing the performed salt, I add the desired carboxylic acid to the zinc oxide. Being exothermic, this reaction is performed at room temperature or preferably in a range of about 20° to 40° C. Sufficient zinc oxide is present to react first with the carboxylic acid in forming the zinc carboxylate and subsequently to react with the dithiophosphoric acid. If the dithiophosphoric acid is introduced into the reactor first, the carboxylic acid is added at the same time as the zinc oxide. I have observed that if the carboxylic acid is added after the zinc oxide and the dithiophosphoric acid have been previously combined, the yields tend to be lower. In other words, if insufficient carboxylate is present during the zinc neutralization reaction, there is occasioned a considerable loss of the dithiophosphoric acid by hydrolysis. Thus, the optimum order of adding reactants is to mix the zinc oxide and the carboxylic acid or zinc carboxylic acid or zinc carboxylate together first and then add the dithiophosphoric acid to the resulting mixture.

The neutralization of the dithiophosphoric acid by zinc oxide is also exothermic and takes from about 2 to 4 hours. It is conducted at about room temperature, preferably maintained in the range of about 20° to 40° C. by using external cooling means. The temperature may likewise be controlled by adding the dithiophosphoric acid gradually to the zinc oxide-zinc carboxylate mixture. I prefer to have some water present in the reaction mixture to commence the neutralization.

The water may be introduced with the zinc oxide or separately. If the zinc carboxylate is in the form of a preformed hydrate, such as zinc acetate dihydrate, the hydrated molecules are sufficient for the neutralization, and no additional water is necessary. A high-boiling organic solvent, such as xylene, which is inert to the reactants, is also added both as a diluent for the dithiophosphoric acid and as an azeotroping agent for the subsequent removal of the water.

When the neutralization reaction is over, that is, when no further heat is given off, the reaction mass is heated to remove the water and to form the coordinated complex salt. The temperature is raised to at least the azeotropic temperature of the reaction mass, and preferably from about 100° to 145° C. As the water is taken off in an azeotropic mixture with the organic solvent, it is believed that the coordinated complex begins to form. This final step is complete when the water has been completely removed.

After the water is removed, the reaction mass is cooled and passed through a filtration unit, using a diatomaceous earth filter aid. Because less zinc oxide remains in the mass, considerably less filter aid is required than in previous methods. The time of filtration is greatly shortened, and extensive washing steps to recover the product from the filter cake are eliminated.

In anticipation of the use of the coordinated complex salt in lubricating oils, a mineral oil may be added to the filtered or unfiltered material, even before removal of the organic solvent. Thus the final product of the present procedure is preferably in the form of a concentrated oil composition. The remainder of the hydrocarbon solvent, originally added to aid in the mixing of the dithiophosphoric acid and as an azeotroping agent may be thereafter distilled off under vacuum.

As indicated in U.S. Patent No. 3,102,096, the zinc dithiophosphate salts, for which the improved method of this invention is applicable, includes those having aryl radicals such as phenyl, naphthyl, or the like these radicals having up to five alkyl substitutions on the ring nucleus with about one to twenty aliphatic carbon atoms. For example, the illustrative examples, hereinafter appearing, deal with the complexing of zinc bis(nonylphenyl) dithiophosphate, or zinc O,O-di(nonylphenyl) phosphorodithioate, as a typical aromatic compound.

The zinc carboxylates or the carboxylic acids to be used for the coordination of zinc dithiophosphates may be aliphatic or aromatic. The aliphatic zinc salts contain from about one to twenty carbon atoms, including zinc acetate, zinc butyrate, and zinc naphthenate salts, derived from petroleum oil naphthenic acids. The aromatic zinc carboxylates may have alkyl substitution on the ring nucleus containing from about one to twenty carbon atoms.

In the place of zinc oxide, zinc carbonate and zinc hydroxide may also be used. In the case of the carbonate, carbon dioxide will be evolved during the reaction.

The invention will be more fully understood by reference to the following examples, while not being expressly limited thereto. Percent and parts, unless otherwise stated, are in terms of weight.

Example I.—Preparation of zinc acetate-coordinated zinc bis(nonylphenyl) dithiophosphate Into a four-neck flask equipped with a stirrer, thermometer, distillate receiver hooked to a reflux condenser, and dropping funnel was added a slurry containing 26.8 grams of 99.5% zinc oxide (equivalent to 0.327 mole) being a 15% molar excess and 100 cc. of distilled water. To this slurry were stirred 18.3 grams (0.304 mole) of glacial acetic acid, and the temperature rose from 24° C. to 40° C. The contents in the flask were cooled to 25° C. and a solution of 162 grams (0.304 mole) of di(nonylphenyl) dithiophosphoric acid in 194 grams of xylene was added dropwise over a four-hour period. After this addition, the reaction mixture was stirred for an additional hour at 25° C.

The mixture was then heated to the azeotropic temperature. A maximum temperature of 143° C. was obtained. When all of the water had been removed with some of the xylene, the mixture was cooled slightly and 6 grams of "Super-Cel" (a diatomaceous earth filter-aid) were added. This was then passed through a filter bed of "Super-Cel" and the filter cake washed twice with hot xylene. To the filtrate were added the xylene washings and 66.6 grams of a paraffinic mineral oil (100 SUS @ 100° F.) The xylene was removed by heating the diluted mixture over a boiling water bath at 0.8 mm., Hg. The weight of the oil-diluted product was 258.8 grams, or of the complex salt, 192.2 grams; this represents a yield of 96%.

Analysis—Calcd. for

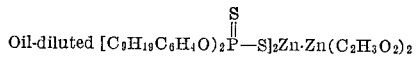

$P=3.5\%$, $S=7.2\%$, $Zn=7.4\%$. Found: $P=3.3\%$, $S=7.3\%$, $Zn=7.3\%$.

The above procedure was altered slightly in two further preparations. In one modification, 155 cc. of distilled water were used instead of 100 cc. and the dithiophosphoric acid-xylene solution was added over a 2-hour period. The yield in this case was 95.5%. In the second modification, 28.6 grams of 99.5% zinc oxide, or 0.350 mole, were used; this represents a 30% molar excess. After mixing all of the reactants and prior to heating to azeotrope, the reaction mass was held at 90° C. for two hours. The yield was 98.2%.

Example II.—Preparation of zinc acetate-coordinated zinc bis(nonylphenyl) dithiophosphate using performed zinc acetate Into a flask similar to that used in Example I, was added 162 grams (0.304 mole) of di(nonylphenyl) dithiophosphoric acid dissolved in 194 grams of xylene. The flask was then placed in a cold-water bath. Into the flask were added 16.2 grams of 99.5% zinc oxide (equivalent to 0.198 mole) and 33.4 grams (0.152 mole) of zinc acetate dihydrate. The temperature rose from 23° C. to 29° C. The mixture was stirred for 30 minutes at that temperature and then was heated to 143° C. to azeotrope the released water.

Thereafter, the mixture was cooled, 6 grams of "Super-Cel" were added and the mixture was filtered under vacuum through a bed of "Super-Cel." The filter cake and filtrate were treated as in Example I to form an oil-diluted concentrate.

The weight of the concentrate was 253.1 grams, or a reaction product weight of 186.5 grams, indicating a yield of 93%.

Analysis.—Calcd.: $P=3.5\%$, $S=7.2\%$, $Zn=7.4\%$. Found: $P=3.5\%$, $S=6.8\%$, $Zn=7.7\%$.

Example III.—Preparation of zinc naphthenate-coordinated zinc bis(nonylphenyl) dithiophosphate Using equipment similar to that of Example I, 6.9 grams of zinc oxide (equivalent to 0.085 mole), 43 cc. of distilled water and 29.2 grams (0.065 mole) of zinc naphthenate were added together with stirring. To this mixture, 77 cc. of xylene were stirred in to dissolve the naphthenate and slurry the zinc oxide. Following this xylene addition, a solution of 69.4 grams (0.130 mole) of di(nonylphenyl) dithiophosphoric acid and 82.6 grams of xylene was added over 1¾ hours at a temperature in the range of 21° to 24° C. When the addition was complete, the temperature was raised to 90° C. for two hours, and then to the azeotrope point to remove the water. The maximum temperature was 140° C.

The reaction mixture was cooled, 3 grams of "Super-Cel" were added to it, and the mixture was passed through a bed of "Super-Cel." Again, the filter and filtrate were treated as described in Example I, using 34 grams of oil diluent.

The weight of the oil-diluted concentrate was 127 grams, or a reaction product weight of 93 grams, indicating a yield of 90.3%.

Analysis.—Calcd. for

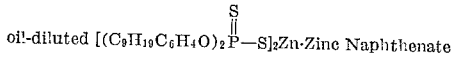

$P=2.9\%$, $S=5.9\%$, $Zn=6.1\%$. Found: $P=2.7\%$, $S=5.6\%$, $Zn=6.9\%$.

While the quantity of water required to initiate the neutralization reaction has no upper limit, the minimum requirement is preferably about two moles of water per mole of carboxylate or zinc dithiophosphate, as indicated in Example II wherein the water originated as hydrated molecules.

The step of adding a processing oil to the reaction product is simply one of convenience. When the coordinated complex salt is blended with a lubricating oil, the physical step of oil blending is facilitated by using an already-prepared oil concentrate. The lubricating oil composition will contain from about 0.01% to 10% of the complex salt, as well as other additives, such as detergents, pour point depressants, viscosity index improvers, and the like.

Although the present invention has been described herein by means of specific embodiments under illustrative examples, it is not intended that the scope thereof be limited in any way thereby but only as indicated in the following claims:

What is claimed is:

1. In a method of preparing a zinc carboxylate-coordinated zinc dithiophosphate salt the improvement comprising the steps of (1) mixing a dithiophosphoric acid having the formula

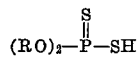

wherein R is selected from the group consisting of aryl and alkaryl, the alkyl substituent containing from 1 to 20 carbon atoms, zinc oxide in an amount of from 10% to 60% in excess of that required to neutralize said acid, and a zinc salt of a carboxylic acid selected from the group consisting of aryl carboxylic acids, and alkyl and alkaryl carboxylic acids, having from 1 to 20 alkyl carbon atoms, in the presence of water and an organic solvent for the said dithiophosphoric acid; (2) neutralizing the said dithiophosphoric acid with zinc oxide at a temperature in the range of from 20 to 40° C. and; (3) coordinating the said neutralization product by removing the water from the reaction mixture.

2. The method of claim 1 wherein the zinc oxide is present as an excess of 15% to 30%.

3. The method of claim 1 wherein the zinc carboxylate is zinc acetate.

4. The method of claim 1 wherein the zinc carboxylate is zinc naphthenate.

5. The method of claim 1 wherein R is nonylphenyl.

6. The method of claim 1 wherein the zinc carboxylate is formed in the reaction mixture in situ by adding the corresponding carboxylic acid to the said reaction mixture.

7. The method of claim 6 wherein the carboxylic acid is acetic acid.

8. The method of claim 6 wherein the zinc oxide and the carboxylic acid react together prior to the neutralization reaction.

9. The method of claim 1 wherein the water is present as the hydrated molecules of the zinc carboxylate and no additional water is added separately.

10. In the method of preparing zinc acetate-coordinated zinc bis(nonylphenyl) dithiophosphate, the improvement comprising adding zinc oxide and water to a reaction vessel, reacting acetic acid with the zinc oxide, at a temperature in the range of 20° to 30° C., whereby the molar ratio of the resulting reaction mixture is in the range 1.15 to 1.30 moles of zinc oxide to 1 mole of zinc acetate, and maintaining the temperature in the said range, ading thereto solvent-diluted di(nonylphenyl) dithiophosphoric acid in amounts sufficient to form an equal number of moles of zinc bis(nonylphenyl) dithiophosphate and zinc acetate and leave a remainder of from 15 to 30 mole percent of unreacted zinc oxide, and coordinating the said zinc bis(nonylphenyl) dithiophosphate with the zinc acetate by removing the water from the reaction mixture.

11. In the method of preparing zinc naphthenate-coordinated zinc bis(nonylphenyl) dithiophosphate, the improvement comprising adding zinc naphthenate and water to zinc oxide wherein the molar ratio of oxide to naphthenate is approximately 1.3 to 1.0, and maintaining the temperature in the range of about 20° to 30° C., adding solvent-diluted di(nonylphenyl) dithiophosphate to the resulting mixture in amount sufficient to form an equal number of moles of zinc bis(nonylphenyl) dithiophosphate as of zinc naphthenate and leave a remainder of 30 mole percent of unreacted zinc oxide, anud coordinating the zinc bis(nonylphenyl) dithiophosphate with the zinc naphthenate by removing the water from the reaction mixture at a temperature in the range of about 100° to 145° C.

12. The method of claim 10, wherein the mixture is heated to a temperature in the range of about 100° to 145° C.

References Cited

UNITED STATES PATENTS 2,790,766  4/1957  Otto _____ 260—429.9 X
3,102,096  8/1963  Nygaard et al. ___ 260—429.9 X TOBIAS E. LEVOW, Primary Examiner.

H. M. S. SNEED, Assistant Examiner.